Feb. 21, 1967 L. H. COOK ET AL 3,305,582
UREA SYNTHESIS WITH RECOVERY OF EXCESS AMMONIA
Filed Sept. 11, 1963
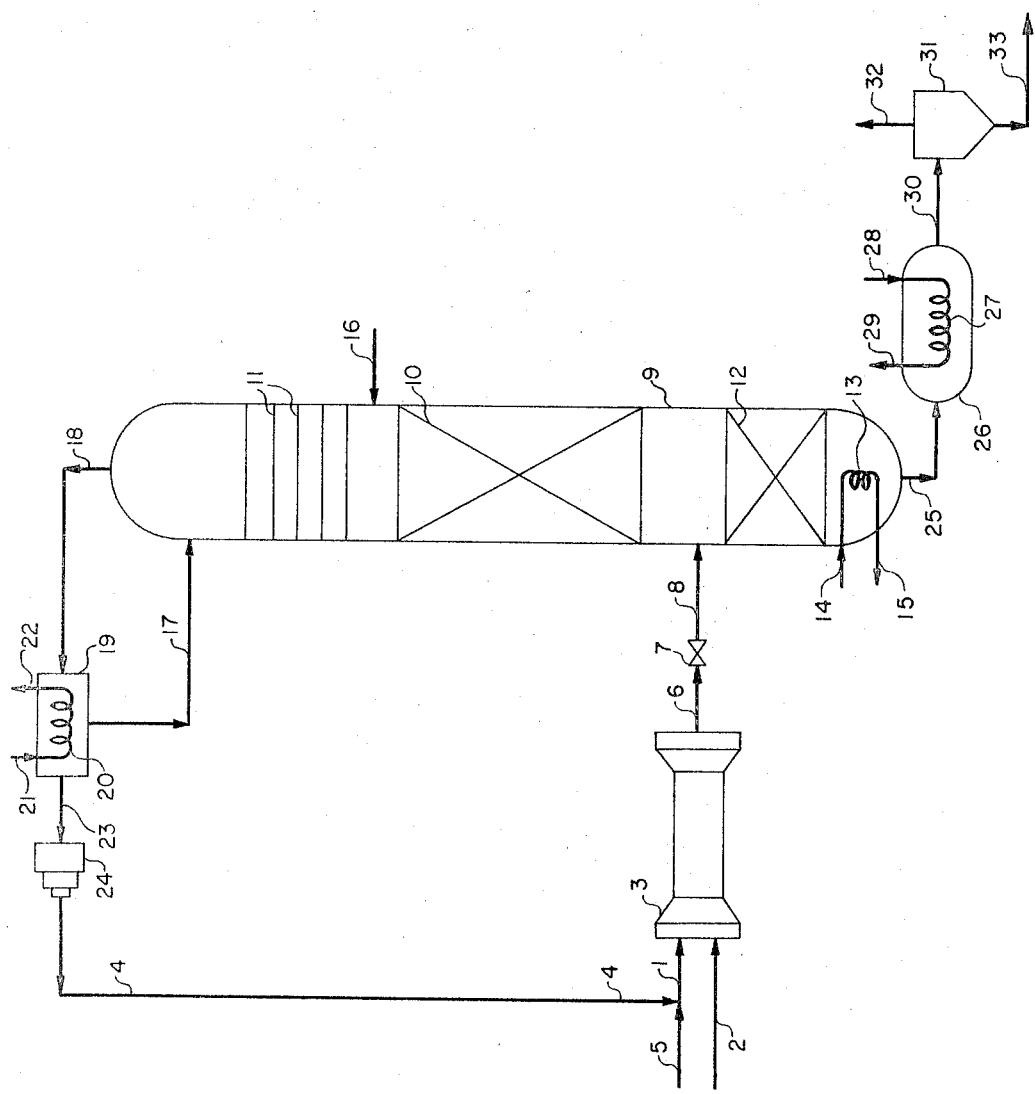
IVO MAVROVIC
LUCIEN H. COOK
INVENTORS
BY J. T. Chalsty
AGENT United States Patent Office 3,305,582
Patented Feb. 21, 1967

3,305,582
UREA SYNTHESIS WITH RECOVERY OF
EXCESS AMMONIA
Lucien H. Cook, Port Washington, and Ivo Mavrovic, New York, N.Y., assignors to Chemical Construction Corporation, New York, N.Y., a corporation of Delaware
Filed Sept. 11, 1963, Ser. No. 308,210
7 Claims. (Cl. 260—555)

The present invention relates to the synthesis of urea, by reaction between ammonia and carbon dioxide. An improved procedure for recovery of excess ammonia is provided, which permits more complete recovery of excess ammonia free of carbon dioxide from the synthesis effluent stream.

The synthesis of urea is carried out by reaction of ammonia with carbon dioxide at elevated pressure and temperature. The reactants initially combine to form the intermediate compound ammonium carbamate. This is a rapid reaction and readily goes to completion. The ammonium carbamate subsequently dehydrates, losing one mol of water to yield urea. The final urea-forming reaction proceeds at a slower rate, and does not go to completion in practice. It is known that the presence of excess ammonia above the stoichiometric requirement for ammonium carbamate formation is advantageous. The excess ammonia acts as a dehydrating agent and thus improves overall process yields in the urea synthesis, by promoting the dehydration of ammonium carbamate. The urea synthesis effluent stream thus generally contains urea, ammonium carbamate, excess ammonia and water. The ammonium carbamate is subsequently separated from the effluent stream by heating at reduced pressure, which causes decomposition of the ammonium carbamate and generation of a mixed off-gas containing ammonia and carbon dioxide. It will be evident that the excess ammonia present in the effluent stream will also be driven off in the mixed off-gas. In order to avoid the removal of a large quantity of excess ammonia in the mixed off-gas, it has been a general practice to initially distill the synthesis effluent stream at reduced pressure so as to remove purified excess ammonia free of carbon dioxide as a separate process stream.

The initial removal of excess ammonia from the urea synthesis effluent stream is complicated by the presence of ammonium carbamate in the effluent stream. Thus, at reduced pressure a limited amount of decomposition of the ammonium carbamate will readily take place, and the excess ammonia which is produced by a simple distillation of the effluent stream will contain a small amount of carbon dioxide. The presence of carbon dioxide in the excess ammonia stream is highly undesirable, since at reduced pressure and temperature the carbon dioxide will re-combine with ammonia to form solid ammonium carbamate. The solid crystals of ammonium carbamate will readily accumulate and clog in piping and process units such as pumps or compressors which are employed to compress and recycle the ammonia to urea synthesis.

Various procedures have been developed in the prior art for the removal of excess ammonia free of carbon dioxide from the urea synthesis effluent stream. One such procedure involves a flash distillation of the effluent stream at reduced pressure. The removal of excess ammonia by flash distillation at a particular reduced pressure is a function of temperature, with greater ammonia removal at higher temperatures. However, this procedure only provides limited recovery of excess ammonia, since flash distillation at elevated temperature results in concomitant ammonium carbamate decomposition, with subsequent vaporization of carbon dioxide into the ammonia gas stream. Thus, flash distillation was generally carried out in prior art practice at low temperature, with only a partial removal of excess ammonia from the synthesis effluent stream.

Improved procedures of the prior art, involving reflux of the excess ammonia stream with an added process component which serves to absorb carbon dioxide into the liquid phase, may also be mentioned. In these procedures higher distillation temperatures may be provided, with greater recovery of excess ammonia from the synthesis effluent stream. In U.S. Patent No. 2,716,629, the off-gas stream is refluxed in the enrichment zone of a distillation column, which is above the point of entry of the synthesis effluent stream into the column. Liquid water or aqua ammonia is added to the column above the enrichment zone, and serves to wash carbon dioxide down into the lower liquid phase in the form of dissolved ammonium carbamate. Thus, higher distillation temperature may be provided in the column with resultant greater removal of excess ammonia as off-gas, since the carbon dioxide is very soluble in the reflux water and is readily re-absorbed. U.S. Patent No. 2,894,878 provides a similar procedure, except that reflux liquid ammonia is passed into the upper portion of the distillation column. It is stated that this procedure is advantageous since it permits the maintenance of high temperature in the distillation column while preventing carbon dioxide vapor from rising to the top of the column. Thus, greater removal of excess ammonia from the urea synthesis effluent is achieved.

The present invention is directed to the problem of substantially complete removal of excess ammonia from urea synthesis effluent streams. A distillation procedure has been developed which is broadly similar to the processes described in the U.S. patents cited supra, except that substantially improved process results are achieved. Thus, the procedure of the present invention represents an important improvement over the procedures of the U.S. patents mentioned supra. In the present invention, the urea synthesis effluent stream is heated in the lower portion of a distillation column, and the rising excess ammonia vapor stream containing carbon dioxide is refluxed in an enrichment section in the upper portion of the column to remove carbon dioxide. The improvement of the present invention comprises the addition of aqueous urea solution to the distillation column above the enrichment section, as a reflux liquid. It has been found that this modification provides substantially improved results, since carbon dioxide is thus readily dissolved into the liquid phase of the enrichment section as ammonium carbamate, and is completely removed from the system in the bottom liquid effluent stream.

The procedure of the present invention is highly advantageous, since it permits the maintenance of relatively high distillation temperatures, with resultant substantially complete removal of excess ammonia in the vapor state. The large amount of carbon dioxide vapor which is generated due to the high distillation temperature is readily re-absorbed into the liquid state, due to the presence of urea in the liquid phase of the enrichment section.

In a preferred embodiment of the present invention, an upper reflux section is provided above the enrichment section, and cold liquid ammonia is passed into the distillation column above the reflux section. The cold liquid ammonia also scrubs the rising vapor stream, and in some cases may remove residual carbon dioxide. A principal effect of the scrubbing with liquid ammonia is to remove water vapor from the rising vapor stream, so as to produce a final excess ammonia vapor stream which is free of water vapor as well as carbon dioxide.

It is an object of the present invention to remove excess ammonia from urea synthesis effluent streams in an improved manner.

Another object is to provide a procedure for the complete removal of excess ammonia from urea synthesis effluent streams.

A further object is to remove excess ammonia from urea synthesis effluent streams while preventing the concomitant removal of carbon dioxide.

An additional object is to remove excess ammonia free of carbon dioxide and water vapor from urea synthesis effluent streams.

Still another object is to employ aqueous urea solution to remove carbon dioxide vapor from the excess ammonia vapor stream generated by distillation of urea synthesis effluent streams.

These and other objects and advantages of the present invention will become evident from the description which follows. Referring to the figure, ammonia process stream 1 and carbon dioxide stream 2 are passed into urea synthesis autoclave 3. Ammonia stream 1 is composed of recycle ammonia stream 4 and makeup ammonia stream 5. The total molar ratio of streams 1 and 2 is generally maintained in the range of 4:1 to 10:1. At lower ratios below 4:1 the advantage in process yield of urea due to the presence of excess ammonia is not obtained to any great extent, and in addition the separate removal of excess ammonia from the synthesis effluent stream is generally not practiced at lower ratios. At ratios above 10:1, the advantages derived from further excess ammonia are questionable, due to the high dilution of the process stream with ammonia. A molar ratio of 6:1 is generally considered to be optimum.

Typical urea synthesis process conditions are maintained in autoclave 3, consisting generally of a pressure in the range of 2000 p.s.i.g. to 6000 p.s.i.g. and temperature in the range of 320° F. to 430° F. Under these reaction conditions, the entire carbon dioxide feed stream 2 is reacted with ammonia to form ammonium carbamate, and a portion of the ammonium carbamate is dehydrated to yield urea. Thus, the resulting synthesis effluent liquid stream 6 contains urea, ammonium carbamate, excess ammonia and water. Stream 6 is now processed to separately recover its excess ammonia content, in accordance with the procedure of the present invention.

Stream 6 is passed through pressure reducing valve 7, and the resulting stream 8 typically at a pressure in the range of 100 p.s.i.g. to 400 p.s.i.g. is passed into distillation column 9. Column 9 is preferably provided with an upper enrichment section 10 and reflux section 11, and a lower stripping section 12. As will appear infra, certain of these elements may be omitted in some cases while still attaining the results of the present invention. Sections 10 and 12 are preferably provided with suitable packing to obtain efficient gas-liquid contact, however other gas-liquid contact means such as sieve trays or bubble cap plates may also be employed to attain the functions of sections 10 and 12.

The liquid stream 8 now passes downward through stripping section 12, countercurrent to a rising vapor stream. Most of the excess ammonia contained in stream 8 is thus vaporized, together with a significant amount of carbon dioxide. The residual liquid phase is heated in the bottom section of column 9 by steam coil 13 to a temperature typically in the range of 200° F. to 400° F., to generate the vapor stream containing ammonia, water vapor and carbon dioxide which rises through column 9. Steam coil 13 is provided with steam via 14, with condensate removal via 15.

The rising vapor stream now passes upwards in column 9 from stripping section 12 into enrichment section 10, where the hot vapor stream is scrubbed by colder aqueous urea solution admitted via 16, preferably at a temperature in the range of 100° F. to 200° F. The cooling and scrubbing of the vapor stream in section 10 results in the dissolving of most or all of the carbon dioxide into the liquid phase as dissolved ammonium carbamate. The downflowing liquid phase from section 10, joins the liquid stream 8 and passes downward to the bottom of column 9. The residual vapor stream now passes upward from section 10 and enters upper reflux section 11, provided with bubble cap trays or other suitable means for reflux. In section 11 the gas stream is cooled and refluxed by contact with liquid ammonia admitted via 17 preferably at a temperature in the range of 60° F. to 140° F. The refluxing in section 11 serves to remove residual carbon dioxide and water vapor from the vapor phase, and substantially pure anhydrous ammonia vapor is removed from column 9 via 18. Vapor stream 18 is now preferably cooled and partially condensed in cooler 19, provided with cooling coil 20 and cooling water or refrigeration inlet 21 and exit 22. The condensed liquid ammonia is withdrawn via 17 to provide reflux ammonia for column 9. The balance of the ammonia is withdrawn from unit 19 via 23, compressed in compressor 24 to urea synthesis pressure, and recycled via 4 to urea synthesis.

Referring now to the bottom of column 9, a liquid stream is withdrawn via 25. Stream 25 is substantially free of excess ammonia, and contains urea, ammonium carbamate and water. Stream 25 is now processed in a conventional manner to recover a product aqueous urea solution, thus stream 25 is passed through ammonium carbamate decomposer 26 provided with heating coil 27, steam inlet 28 and condensate removal line 29. In unit 26 the process stream is heated to decompose ammonium carbamate and form a mixed ammonia-carbon dioxide offgas stream. The resultant process stream 30 is passed to gas-liquid separator 31, which is a unit such as a cyclone in which separation of gaseous and liquid phases is achieved. A mixed off-gas stream 32 containing ammonia, carbon dioxide and water vapor is withdrawn from unit 31, and may be processed in a conventional manner to separate the ammonia and carbon dioxide components for recycle. Alternatively, stream 32 may be contacted with nitric acid to recover ammonia values as ammonium nitrate. The residual liquid phase consisting of product aqueous urea solution is withdrawn from unit 31 via 33. Stream 33 is now passed to urea finishing operations such as evaporative crystallization or prilling. A portion of stream 33 may be cooled and recycled via 16 to provide the aqueous urea solution reflux for column 9.

Various alternatives within the scope of the present invention may be mentioned. It is possible to operate column 9 without stripping zone 12 for vapor generation, relying entirely on the heating effect of coil 13 to generate a vapor stream and remove all of the excess ammonia from the liquid phase. This alternative is especially practicable when column 9 is operated at relatively lower pressure and higher bottoms temperature.

In another alternative, upper section 11 may be omitted from column 9. Reflux liquid ammonia stream 17 would also be omitted in this case. In order to achieve complete removal of carbon dioxide from the vapor phase in this modification, it is evident that the flow rate of stream 16 would have to be relatively high, and in addition stream 16 would have to be quite cold or refrigerated. In this case it is evident that the product vapor stream 18 will contain a substantial amount of water vapor, however in some cases this is not objectionable.

An additional alternative mode of operation of column 9 may also be mentioned. Reflux trays 11 may be provided with cooling or refrigeration coils, so as to condense a substantial portion of the rising vapor phase and thus provide a reflux effect. This modification would permit the elimination of reflux ammonia stream 17, while still achieving the desired results in removal of residual carbon dioxide and water vapor from the vapor phase.

The decomposition of ammonium carbamate in stream 25 has been shown as taking place in a single stage at one pressure level. This mode of operation was shown for illustrative purposes only, since in practice it is generally found to be thermally more efficient to carry out the decomposition of ammonium carbamate in two or more stages, at successively decreasing pressure levels.

An example of an industrial application of the procedure of the present invention will now be described.

*Example*

An existing urea synthesis facility, operating in a conventional manner with the excess ammonia separation unit provided with water reflux, was modified in accordance with the present invention. The urea production rate was substantially increased, without modifying or enlarging process equipment. In the following process description, all flow rates will be expressed in pounds per hour.

The original facility provided feed rates to the urea synthesis autoclave of 29,105 pounds per hour of ammonia and 15,350 carbon dioxide. The autoclave was operated at 400° F. and 4400 p.s.i.g., and the resultant urea synthesis effluent stream contained 15,625 urea, 6760 ammonium carbamate, 17,281 excess ammonia and 4732 water. The effluent stream was passed to the excess ammonia separator at 225 p.s.i.g., and the separator unit was operated with a bottoms temperature of 250° F. A water reflux feed rate of 1553 was provided to the upper section of the separator, and pure excess ammonia vapor was withdrawn overhead at a rate of 12,917. The bottoms liquor withdrawn from the separator and passed to the ammonium carbamate decomposer contained 15,625 urea, 6760 ammonium carbamate, 4364 excess ammonia and 6285 water.

The original process describes supra was modified by providing aqueous urea solution reflux to the excess ammonia separator. With ammonia feed rate remaining unchanged, the carbon dioxide feed rate was substantially increased with concomitant increased output of urea. In addition, the excess ammonia separator was operable at a higher temperature while still producing pure ammonia vapor free of carbon dioxide. Thus, in the modified system, 29,105 ammonia and 19,750 carbon dioxide were fed to the urea synthesis autoclave. The autoclave operating conditions remained unchanged. The resulting urea synthesis effluent stream contained 19,200 urea, 10,120 ammonium carbamate, 13,790 excess ammonia and 5760 water. The effluent stream was passed to the excess ammonia separator at 225 p.s.i.g., and the separator unit was operated with a higher bottoms temperature of 260° F. An aqueous urea solution reflux consisting of 1300 urea and 700 water was fed to the upper section of the separator, and pure excess ammonia vapor was withdrawn overhead at a rate of 10,891. The bottoms liquor withdrawn from the separator and passed to the ammonium carbamate decomposer contained 20,500 urea, 10,120 ammonium carbamate, 2899 excess ammonia and 6460 water.

Thus in summary, the operation of the facility with aqueous urea solution reflux to the excess ammonia separator permitted a net increase in urea output of 3,575 pounds per hour, equivalent to an increase in production capacity of 22.8%. This increase in production capacity was obtained without any additional capital investment or modification of the process equipment.

We claim:

1. In a urea synthesis process wherein ammonia and carbon dioxide are reacted at elevated urea synthesis pressure and temperature to produce a liquid synthesis effluent stream containing urea, ammonium carbamate, excess ammonia and water, said liquid effluent stream is heated at reduced pressure to produce a hot vapor phase principally containing ammonia and a residual liquid portion, said hot vapor phase is processed to produce ammonia substantially free of carbon dioxide, said residual liquid portion is heated to decompose ammonium carbamate and produce an off-gas containing ammonia and carbon dioxide, and said off-gas is separated from product aqueous liquid urea solution, the improved method of separating carbon dioxide from said hot vapor phase which comprises (a) scrubbing said hot vapor phase with cold aqueous urea solution substantially free of ammonium carbamate, whereby carbon dioxide is dissolved from said vapor phase into said aqueous urea solution and a residual cooled vapor phase comprising ammonia substantially free of carbon dioxide is produced, and
   (b) adding the aqueous urea solution containing dissolved carbon dioxide derived from step (a) to said residual liquid portion.

2. The process of claim 1, in which said cold aqueous urea solution of step (a) comprises a portion of said product aqueous liquid urea solution.

3. In a urea synthesis process wherein ammonia and carbon dioxide are reacted at elevated urea synthesis pressure and temperature to produce a liquid synthesis effluent stream containing urea, ammonium carbamate, excess ammonia and water, said liquid effluent stream is heated at reduced pressure to produce a hot vapor phase principally containing ammonia and a residual liquid portion, said hot vapor phase is processed to produce ammonia substantially free of carbon dioxide, said residual liquid portion is heated to decompose ammonium carbamate and produce an off-gas containing ammonia and carbon dioxide, and said off-gas is separated from product aqueous liquid urea solution, the improved method of separating carbon dioxide from said hot vapor phase which comprises (a) scrubbing said hot vapor phase with cold aqueous urea solution substantially free of ammonium carbamate, whereby carbon dioxide is dissolved from said vapor phase into said aqueous urea solution and a residual cooled vapor phase comprising ammonia containing a minor residual proportion of carbon dioxide is produced,
   (b) further cooling and refluxing said residual cooled vapor phase to condense residual carbon dioxide into a liquid phase and produce a final cold residual vapor phase comprising ammonia substantially free of carbon dioxide, and
   (c) adding the aqueous urea solution containing dissolved carbon dioxide derived from step (a) to said residual liquid portion.

4. The process of claim 3, in which said cold aqueous urea solution of step (a) comprises a portion of said product aqueous liquid urea solution.

5. The process of claim 3, in which the cooling and refluxing of the residual cooled vapor phase in step (b) is produced by addition of liquid ammonia to said residual cooled vapor phase during refluxing.

6. In a urea synthesis process wherein ammonia and carbon dioxide are reacted at elevated urea synthesis pressure and temperature to produce a liquid synthesis effluent stream containing urea, ammonium carbamate, excess ammonia and water, said liquid effluent stream is heated at reduced pressure to produce a hot vapor phase principally containing ammonia and a residual liquid portion, said hot vapor phase is processed to produce ammonia substantially free of carbon dioxide, said residual liquid portion is heated to decompose ammonium carbamate and produce an off-gas containing ammonia and carbon dioxide, and said off-gas is separated from product aqueous liquid urea solution, the improved method of separating carbon dioxide from said hot vapor phase which comprises (a) heating said liquid effluent stream and generating said hot vapor phase by flowing said liquid effluent stream downwards in contact with and countercurrent to a rising hot vapor stream,
   (b) further heating the resulting liquid phase from step (a) to produce said hot vapor stream and a residual liquid phase comprising said residual liquid portion,
   (c) scrubbing the hot vapor phase derived from step (a) with cold aqueous urea solution substantially free of ammonium carbamate, whereby carbon dioxide is dissolved from said vapor phase into said aqueous urea solution and a residual cooled vapor phase comprising ammonia containing a minor residual proportion of carbon dioxide is produced,
(d) further cooling and refluxing said residual cooled vapor phase by addition of liquid ammonia, to condense residual carbon dioxide into a liquid phase and produce a final cold residual vapor phase comprising ammonia substantially free of carbon dioxide, and
(e) adding the aqueous urea solution containing dissolved carbon dioxide derived from step (c) to said liquid effluent stream at reduced pressure during step (a).

7. In a urea synthesis process wherein ammonia and carbon dioxide are reacted at a pressure in the range of 2000 p.s.i.g. to 6000 p.s.i.g. and temperature in the range of 320° F. to 430° F., with a molar ammonia-carbon dioxide ratio in the range of 4:1 to 10:1, to produce a liquid synthesis effluent stream containing urea, ammonium carbamate, excess ammonia and water, said liquid effluent stream is heated at a reduced pressure in the range of 100 p.s.i.g. to 400 p.s.i.g. and temperature in the range of 200° F. to 400° F. to produce a hot vapor phase principally containing ammonia and a residual liquid portion, said hot vapor phase is processed to produce ammonia substantially free of carbon dioxide, said residual liquid portion is heated to decompose ammonium carbamate and produce an off-gas containing ammonia and carbon dioxide, and said off-gas is separated from product aqueous liquid urea solution, the improved method of separating carbon dioxide from said hot vapor phase which comprises (a) scrubbing said hot vapor phase with aqueous urea solution, said solution being at an initial temperature in the range of 100° F. to 200° F. and substantially free of ammonium carbamate, whereby carbon dioxide is dissolved from said vapor phase into said aqueous urea solution and a residual cooled vapor phase comprising ammonia containing a minor residual proportion of carbon dioxide is produced,
(b) further cooling and refluxing said residual cooled vapor phase by addition of liquid ammonia, said liquid ammonia being at an initial temperature in the range of 60° F. to 140° F., to condense residual carbon dioxide into a liquid phase and produce a final cold residual vapor phase comprising ammonia substantially free of carbon dioxide, and
(c) adding the aqueous urea solution containing dissolved carbon dioxide derived from step (a) to said residual liquid portion.

References Cited by the Examiner
UNITED STATES PATENTS

| | | | |
|---|---|---|---|
| 2,701,262 | 2/1955 | Cook | 260—555 |
| 2,716,629 | 8/1955 | Kodama et al. | 260—555 |
| 2,894,878 | 7/1959 | Cook | 203—50 |
| 3,069,234 | 12/1962 | Cook et al. | 260—555 |
| 3,155,723 | 11/1964 | Kurpit et al. | 260—555 |
| 3,172,911 | 3/1965 | Mavrovic | 260—555 |

NORMAN YUDKOFF, *Primary Examiner.*

WILBUR L. BASCOMB, JR., *Examiner.*